US005543696A

United States Patent [19]
Huggett et al.

[11] Patent Number: 5,543,696
[45] Date of Patent: Aug. 6, 1996

[54] POSITION CONTROL FOR HYBRID SERVOMECHANISMS

[75] Inventors: Colin E. Huggett; John I. Cleek, both of Torrance, Calif.

[73] Assignee: AlliedSignal Inc., Morristown, N.J.

[21] Appl. No.: 988,635

[22] Filed: Dec. 10, 1992

[51] Int. Cl.⁶ .................................................. G05B 11/18
[52] U.S. Cl. ......................... 318/590; 318/594; 318/616; 318/624; 318/652
[58] Field of Search ...................... 318/12, 432, 590–594, 318/600–602, 611, 615, 616, 617, 618, 624, 638, 652–5; 388/809–815, 803–806

[56] References Cited

U.S. PATENT DOCUMENTS

| | | | |
|---|---|---|---|
| 3,508,133 | 4/1970 | Schneider et al. | |
| 3,668,495 | 6/1972 | Eisele et al. | |
| 3,797,320 | 3/1974 | Clampitt | 318/631 |
| 3,824,438 | 7/1974 | Wiebe | 318/631 |
| 3,836,835 | 8/1974 | Sawyer | 318/685 |
| 4,104,572 | 8/1978 | Hanson | 318/631 |
| 4,164,896 | 8/1979 | Aldrich | 98/1.5 |
| 4,409,531 | 10/1983 | Bjurstrom | 318/631 |
| 4,547,692 | 10/1985 | Spaulding | 318/592 |
| 4,587,467 | 5/1986 | Breiner | |
| 4,661,756 | 4/1987 | Murphy et al. | 318/701 |
| 4,710,865 | 12/1987 | Higomura | 318/592 X |
| 4,810,941 | 3/1989 | Ohisi et al. | 318/592 X |
| 4,928,050 | 5/1990 | Torisawa et al. | 318/696 |
| 5,030,900 | 7/1991 | Kono et al. | 318/592 X |

Primary Examiner—William M. Shoop, Jr.
Assistant Examiner—David Martin
Attorney, Agent, or Firm—John R. Rafter

[57] ABSTRACT

A hybrid servomechanism includes a speed control, a rotor position control and a brushless motor. When enabled, the position control commands a stationary stator mmf vector, allowing the motor's rotor to rotate until load torque and motor torque are balanced. This position control eliminates limit cycle operation and allows the motor to compensate for backdriving caused by external loads.

17 Claims, 1 Drawing Sheet

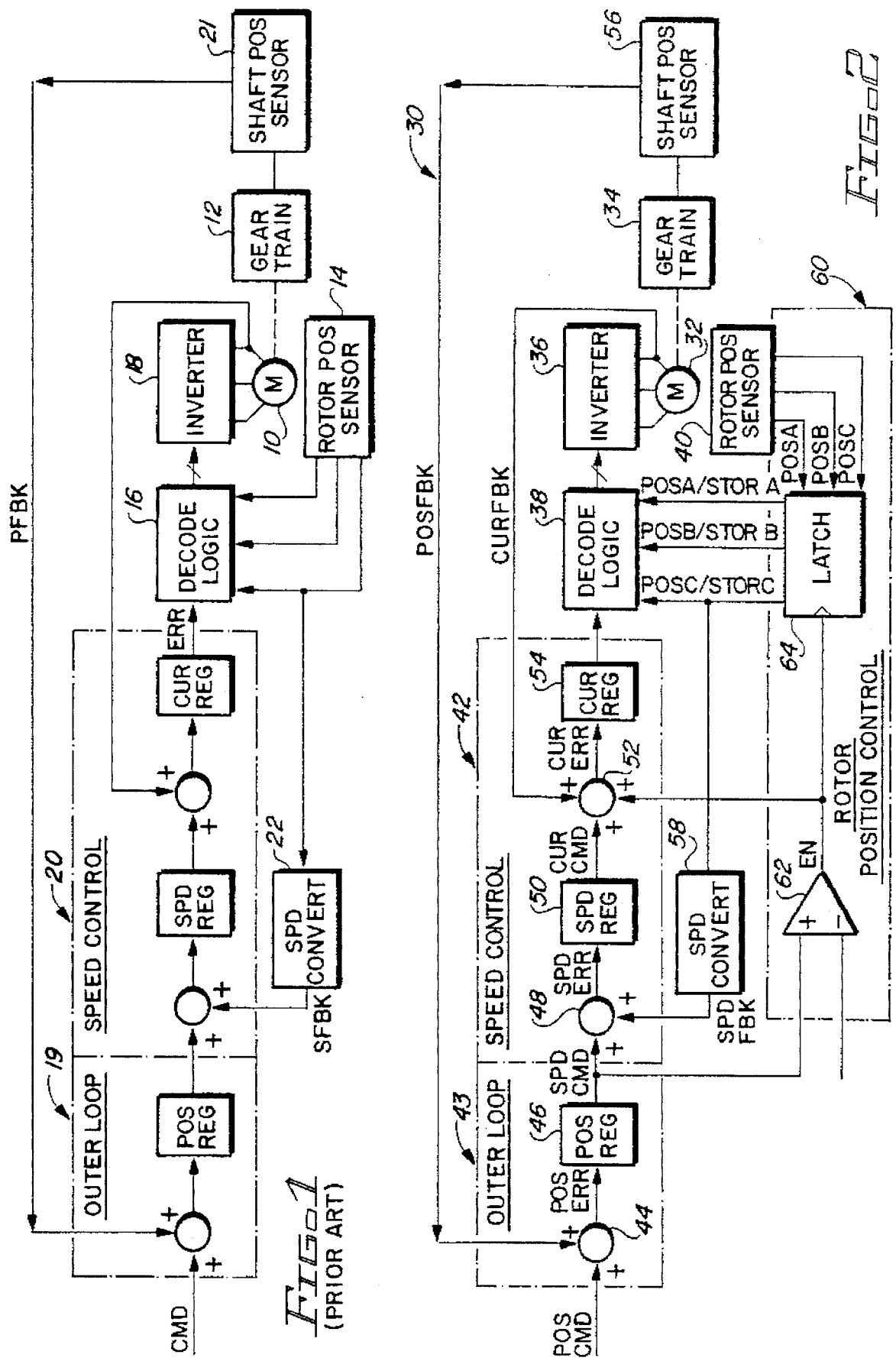

POSITION CONTROL FOR HYBRID SERVOMECHANISMS

BACKGROUND OF THE INVENTION

This invention relates in general to servomechanisms and in particular to a hybrid servomechanism including a speed control, a position control and a brushless motor.

A simple servomechanism employing a brushless dc motor 10 and gear train 12 is shown in FIG. 1. The motor 10 has a permanent magnet rotor which is surrounded by stator windings. Position of the rotor's flux vector with respect to the stator windings is sensed by Hall effect sensors 14. Rotor position signals generated by the Hall effect sensors 14 are processed into commutation commands by decode logic 16. A solid-state inverter 18 commutates current in the stator windings in response to the commutation commands. The energized stator windings generate a stator mmf vector that is displaced 90 ±30 electrical degrees from the rotor's flux vector. The resulting torque reaction between rotor flux and stator mmf causes the rotor to rotate.

A closed loop speed control 20 and outer loop 19 are shown controlling motor torque according to a position command CMD, a position feedback signal PFBK and a speed feedback signal SFBK. Generated is an error signal ERR which controls the amount of current flowing through the stator windings. The motor torque is proportional to the product of the motor stator current, the rotor flux and the cosine of the angle between the rotor flux and stator mmf vectors.

The position feedback signal PFBK can be obtained by integrating the speed feedback signal SFBK. Alternatively, the position feedback signal PFBK can be generated by a position sensor 21 which senses the rotation of the gear train's output shaft.

The speed feedback signal SFBK is generated by a motor speed converter 22. Utilizing one or more of the rotor position signals, the motor speed converter 22 measures time between rotor position events to determine motor speed. Utilizing one rotor position signal, motor speed is determined once every 360 electrical degrees. Frequency multipliers utilizing all of the rotor position signals can be employed to increase resolution of the speed feedback signal SFBK.

However, such motor speed converters 22 are known to produce a deadband in the speed feedback signal SFBK. As the motor speed slows, it takes a longer time for the converter 22 to measure rotor events. Thus, accuracy of the speed feedback signal SFBK decreases as motor speed decreases. In the resulting deadband the speed feedback is unusable.

A problem arises when the speed feedback falls within the deadband: the motor 10 cannot hold its commanded position. As the servomechanism reaches its commanded position and the motor speed approaches zero, the servomechanism operates in a stable limit cycle. As a result, the position of the servomechanism oscillates at or near zero speed. Thus, a fixed position cannot be held. Further, the motor movement causes the gear train 12 to wear. The wear is especially rapid when the servomechanism operates at a single position for a large portion of its life.

For applications where the servomechanism is backdriven by an externally-applied load (e.g., the outflow valve of an aircraft cabin pressure control system), the amplitude of the motor movement is amplified, causing increased wear on the gear train 12. Although irreversible gear trains have been used in such applications, they are expensive and difficult to manufacture with repeatable characteristics. In addition, the irreversible gear trains must be made with an efficiency of less than fifty percent, thereby increasing the size and cost of the servomechanism.

The use of a mechanical brake can provide an acceptable means of holding zero speed. However, the mechanical wear on the moving parts of the brake results in frequent maintenance. Further, the brake is expensive, making it undesirable.

Therefore, it is an objective of this invention to ensure that the servomechanism does not backdrive when a constant position is being held.

It is a further objective to eliminate the limit cycle operation of the servomechanism at zero speed command, thereby eliminating the otherwise rapid wear of the gear train 12.

SUMMARY OF THE INVENTION

These objectives are achieved by a hybrid servomechanism comprising speed control means, rotor position control means, commutating means and a brushless motor. Current is commutated in the motor's stator windings by the commutating means. The amount of current in the stator windings is controlled by the speed control means. When motor speed is less than a threshold value (e.g.), (the speed deadband of the speed feedback signal), the rotor position control means commands the commutating means to generate a stationary stator mmf vector.

The electric motor can be a brushless dc motor having a gear train with a very high efficiency, or it can be a switched reluctance motor with appropriate power inverter. The servomechanism can be employed to control an outflow valve of a cabin pressure control system.

BRIEF DESCRIPTION OF THE DRAWINGS

FIG. 1 is a block diagram of a servomechanism according to the prior art; and

FIG. 2 is a block diagram of a servomechanism according to the present invention.

DETAILED DESCRIPTION OF THE PREFERRED EMBODIMENT

FIG. 2 shows a servomechanism 30 employing a three-phase brushless dc motor 32, gear train 34, solid-state inverter 36 and decode logic 38. Rotor position sensors 40 generate signals POSA, POSB and POSC indicating the position of the motor's rotor relative to the motor's three phase windings. Certain bipolar Hall effect sensors, for example, turn on (logic level "0") in the presence of a magnetic south pole and turn off (logic level "1") in the presence of a magnetic north pole.

Motor torque is controlled by a closed loop speed control 42 and outer loop 43. A position command POSCMD and a position feedback signal POSFBK are compared by a first summer 44, whose output provides a position error signal POSERR. The position error signal POSERR is amplified by a position regulator 46, which outputs a speed command SPDCMD. The speed command SPDCMD is compared to a speed feedback signal SPDFBK by a second summer 48, whose output provides a speed error signal SPDERR. The speed error signal SPDERR is amplified by a speed regulator 50, which outputs a current command CURCMD. The current command CURCMD is compared to a current feedback signal CURFBK by a third summer 52, whose output provides a current error signal CURERR, which amplified by a current regulator 54 and supplied to the decode logic 38.

A shaft position sensor 56, which senses the rotation of the gear train's output shaft, supplies the position feedback signal POSFBK to the first summer 44. The position sensor 21 can be a potentiometer, linear variable differential transformer (LVDT) or any other sense mechanism that is well known to those skilled in the art.

A motor speed converter 58 supplies the speed feedback signal SPDFBK to the second summer 48 of the closed loop speed control 42. The speed feedback signal SPDFBK has a speed deadband that is typically considered to be 3% of the motor's maximum rated speed. The speed deadband is dependent upon gear train efficiency, load torque and motor/load inertia.

To overcome the problems caused by the speed deadband, a rotor position control 60 is employed. The rotor position control 60 includes a comparator 62 and a latch 64. The comparator 62 is supplied with the speed command SPDCMD generated by the position regulator 46 and a signal T indicating speed deadband. Whenever the speed command SPDCMD is greater than the speed deadband (e.g., approximately ±3%), the comparator 62 generates a signal which causes the latch 64 to pass the rotor position signals POSA, POSB and POSC from the rotor position sensors 40 to the decode logic 38. As a result, motor torque is controlled in a conventional manner by maintaining the motor's stator mmf flux vector at 90 ±30 electrical degrees relative to the rotor flux vector. Thus, the speed control 42 is enabled and the rotor position control 60 is disabled.

However, when the speed command SPDCMD falls into the speed deadband, the comparator 62 generates a signal EN which causes the latch 64 to store a single set of rotor position signals. These stored signals STORA, STORB, STORC, which select the windings to be energized, are supplied to the decode logic 38. The output of the comparator 62 also supplies a bias to the third summer 52 which forces a current error signal CURERR, causing current to flow through the selected windings and thereby creating a stationary stator mmf vector. Without the bias, thee position error signal POSERR would be nulled and current would not be commanded to flow through the selected stator windings. Thus, the bias is required to create the stationary stator mmf vector. The torque generated by the motor in this condition is proportional to the product of the stator current, the rotor flux and the cosine of the angle between the rotor flux and stator mmf vectors. Depending upon the torque transmitted to the motor shaft by the gear train 34 and external load, the motor rotor will rotate up to 90 electrical degrees, until the motor torque balances out the load torque. Because the bias and, therefore, current are at a fixed level, any additional external loading will cause the rotor to rotate until the motor torque balances out the new load torque. For systems whose gear trains 34 have large gear ratios, the additional rotation is inconsequential.

Thus, the use of the rotor position control 60 eliminates limit cycle operation and allows the motor 32 to compensate for backdriving. Also eliminated is the need for an irreversible gear train or a mechanical brake. Furthermore, the gear train 34 can have a high efficiency, making it inexpensive to manufacture and maintain.

The servomechanism 30 can be employed to control the outflow valve of a cabin pressure control system. Instead of controlling to position, the outer loop of the servomechanism would control to pressure. An exemplary cabin pressure control system is disclosed in Aldrich U.S. Pat. No. 4,164,896, which is incorporated herein by reference. This patent is assigned to Allied-Signal, Inc., the assignee of the present invention.

The speed and rotor position controls 42 and 60 and outer loop 43 can be implemented in either hardware or software. Further, those skilled in the art will appreciate that a switched reluctance machine and its appropriate inverter can be controlled in a similar manner by the speed and rotor position controls 42 and 60.

Those skilled in the art will also appreciate that the outer loop of the servomechanism 30 does not have to control to position. Rather, the outer loop can control to any desired parameter, such as pressure.

Therefore, it will be understood that the servomechanism 30 of FIG. 2 is merely exemplary and that a person skilled in the art may make many variations and modifications without departing from the spirit and scope of the invention. All such modifications are intended to be included within the scope of the invention as defined in the appended claims.

We claim:

1. A servomechanism comprising:

an electric motor having a rotor and a stator, commutating means for commutating current in said stator's windings which includes rotor position sensor means for generating signals indicating the position of said rotor with respect to said stator windings speed control means for controlling the amount of current in said windings;

rotor position control means for commanding said commutating means to generate a stationary stator Magnetomotive Force (mmf) vector when motor speed is less than a threshold value said rotor position control means includes an indicating means for indicating when motor speed is less than said threshold value; and vector position means, responsive to said indicating means, for passing said rotor position signals from said rotor position sensor means to said commutating means when motor speed is greater than said threshold value, and for supplying a single set of rotor position signals to said commutating means when motor speed is less than said threshold value.

2. The servomechanism of claim 1, wherein said vector position means includes storing means for storing a set of rotor position signals, said stored rotor position signals being supplied to said commutating means when motor speed is less than said threshold value; and means for passing said rotor position signals from said rotor position sensor means to said commutating means when motor speed is greater than said threshold value.

3. The servomechanism of claim 2, wherein said rotor position control means further includes biasing means for biasing said speed control means to cause said current to flow through said stator windings when said stored rotor position signals are being supplied to said commutating means.

4. The servomechanism of claim 3, wherein said speed control means generates speed commands, wherein said vector position means includes latch means for storing and passing said rotor position signals, and wherein said indicating means includes comparator means for comparing said speed command to a signal indicating said threshold value, an output of said comparator means providing a signal which simultaneously biases said speed control means and enables said latch means to supply said stored rotor position signals to said commutating means.

5. The servomechanism of claim 1, wherein said electric motor includes a brushless dc motor having a highly efficient gear train.

6. The servomechanism of claim 1, further comprising a motor speed converter for providing a speed feedback signal to said speed control means, said speed feedback signal having a speed deadband, wherein said threshold value indicates said speed deadband.

7. A servomechanism comprising:

an electric motor having a rotor and a stator;

rotor position sensing means for generating rotor position signals indicating the position of said rotor relative to said stator windings;

commutating means for commutating current in said stator's windings;

a motor speed converter for providing a speed feedback signal indicating motor speed, said speed feedback signal having a speed deadband;

speed control means for controlling the amount of said current flowing through said stator windings in response said speed feedback signal; and a rotor position control including indicating means for indicating when motor speed is less than said speed deadband; vector position means, responsive to said indicating means, for passing said rotor position signals from said rotor position sensing means to said commutating means when motor speed is greater than said speed deadband, and for supplying a single set of rotor position signals to said commutating means when motor speed is less than said speed deadband; and biasing means for biasing said speed control to cause current to flow through said stator windings when said stored rotor position signals are being supplied to said commutating means.

8. The servomechanism of claim 7, wherein said speed control means generates a speed command for comparison to said speed feedback signal, wherein said vector position means includes latch means for storing and passing said rotor position signals, and wherein said indicating means includes comparator means for comparing said speed command to a signal indicating speed deadband, an output of said comparator means providing a signal which biases said speed control means and enables said latch means to supply said stored rotor position signals to said commutating means.

9. The servomechanism of claim 7, wherein said electric motor includes a brushless dc motor having a highly efficient gear train.

10. The servomechanism of claim 7, wherein said electric motor includes a brushless dc motor having a gear train with a large gear ratio.

11. A position control for a brushless dc motor having a stator comprising:

vector position means for commanding a stationary stator magnetomotive force (mmf) vector when motor speed falls within a speed range which includes:

means for indicating when motor speed falls within said speed range;

biasing means for commanding current to flow in said stator when motor speed falls within said speed range in which the stator current is commuted according to rotor position signals; and means, responsive to said indicating means, for supplying actual rotor position signals when motor speed is greater than said speed range, and for supplying a stored set of rotor position signals when motor speed falls within said speed range.

12. The position control of claim 11, wherein said supplying means includes a latch for supplying said actual and stored rotor position signals, and wherein said indicating means includes a comparator for comparing a speed command to a signal indicating speed deadband, an output of said comparator providing a signal which enables said latch and generates a stator current command when motor speed falls within said range.

13. A cabin pressure control system comprising an outflow valve and a servomechanism for controlling said outflow valve, said servomechanism including:

an electric motor having a rotor and a stator;

a gear train, responsive to said rotor, for opening and closing said outflow valve, said gear train having a large gear ratio and a high efficiency;

commutating means for commutating current in said stator's windings;

a motor speed converter for providing a speed feedback signal indicating speed of said motor, said speed feedback signal having a speed deadband;

speed control means, responsive to said motor speed converter, for controlling the amount of current in said windings; and rotor position control means for commanding said commutating means to generate a stationary stator magnetomotive force (mmf) vector when motor speed is less than said speed deadband.

14. The servomechanism of claim 13, wherein said commutating means includes rotor position sensor means for generating signals indicating the position of said rotor with respect to said stator windings, and wherein said rotor position control means includes:

indicating means for indicating when motor speed is less than said speed deadband; and vector position means, responsive to said indicating means, for passing said rotor position signals from said rotor position sensor means to said commutating means when motor speed is greater than said speed deadband, and for supplying a single set of rotor position signals to said commutating means when motor speed is less than said speed deadband.

15. The servomechanism of claim 14, wherein said vector position means includes storing means for storing a set of rotor position signals, said stored rotor position signals being supplied to said commutating means when motor speed is less than said speed deadband; and means for passing said rotor position signals from said rotor position sensor means to said commutating means when motor speed is greater than said speed deadband.

16. The servomechanism of claim 15, wherein said rotor position control means further includes biasing means for biasing said speed control means to cause said current to flow through said stator windings when said stored rotor position signals are being supplied to said commutating means.

17. The servomechanism of claim 16, wherein said speed control means generates speed commands, wherein said vector position means includes latch means for storing and passing said rotor position signals, and wherein said indicating means includes comparator means for comparing said speed command to a signal indicating speed deadband, an output of said comparator means providing a signal which simultaneously biases said speed control means and enables said latch means to supply said stored rotor position signals to said commutating means.

* * * * *